United States Patent [19]
Bennett

[11] 3,809,069

[45] May 7, 1974

[54] APPARATUS AND METHOD FOR MEASURING INTELLIGENCE

[76] Inventor: William Frederick Bennett, 940 15th St., West Vancouver, B.C., Canada

[22] Filed: Mar. 22, 1972

[21] Appl. No.: 236,841

Related U.S. Application Data

[63] Continuation-in-part of Ser. No. 95,874, Dec. 7, 1970, abandoned, which is a continuation of Ser. No. 741,194, June 28, 1968, abandoned, which is a continuation-in-part of Ser. No. 569,328, Aug. 1, 1966, abandoned.

[30] Foreign Application Priority Data

Aug. 4, 1965   Great Britain .................... 33284/65

[52] U.S. Cl. ............................................. 128/2.1 B
[51] Int. Cl. .............................................. A61b 5/04
[58] Field of Search .......... 128/2.1 B, 2.1 R, 2.06 A

[56] References Cited
UNITED STATES PATENTS

| | | | |
|---|---|---|---|
| 3,498,287 | 3/1970 | Ertl ................................. | 128/2.1 B |
| 3,123,768 | 3/1964 | Burch et al. ..................... | 128/2.1 B |
| 2,860,627 | 11/1958 | Harden et al. .................. | 128/2.1 B |
| 3,623,477 | 11/1971 | Trent ............................... | 128/2.1 B |
| 3,215,136 | 11/1965 | Holter et al. .................... | 128/2.06 A |
| 3,087,487 | 4/1963 | Clynes ............................. | 128/2.1 B |

Primary Examiner—William E. Kamm
Attorney, Agent, or Firm—Carver and Company

[57] ABSTRACT

Apparatus and method for measuring intelligence of a subject exposed to pulsed stimuli which stimuli evoke sensory response in subject. Response is detected, amplified and signal-to-noise ratio increased producing improved signal with increased legibility. Signal is recorded and is analyzed to determine a dominant fundamental frequency which is related to intelligence of the subject. Frequency so obtained is compared with frequencies obtained from other subjects of known intelligence so as to obtain measure of intelligence of first subjects. Other subjects have been previously tested by prior art intelligence tests and have also been tested by instant invention so as to obtain relationship between intelligence and record of improved signal. Use of computer for analysis and comparison permits relatively quick measurement of intelligence.

11 Claims, 13 Drawing Figures

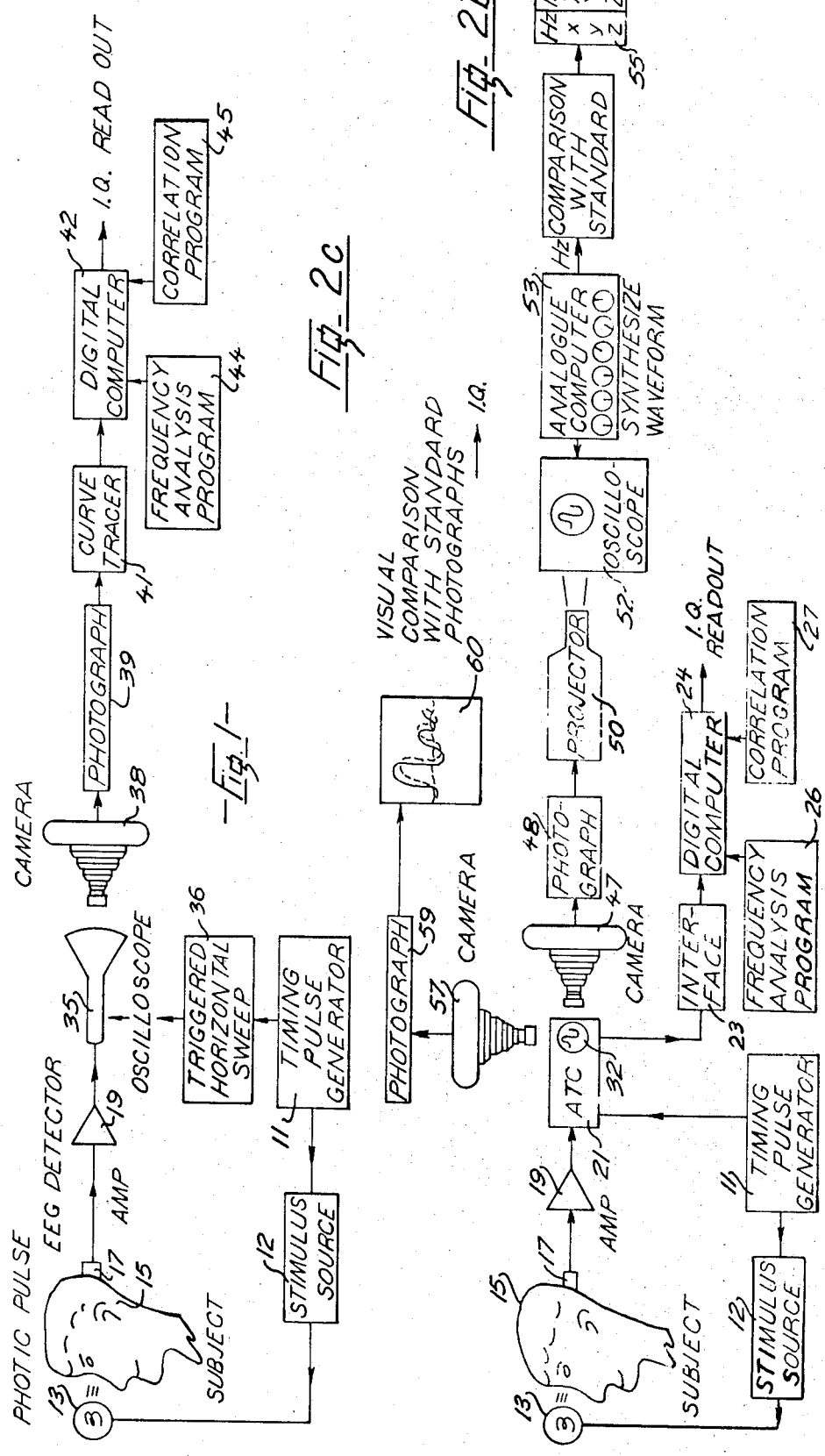

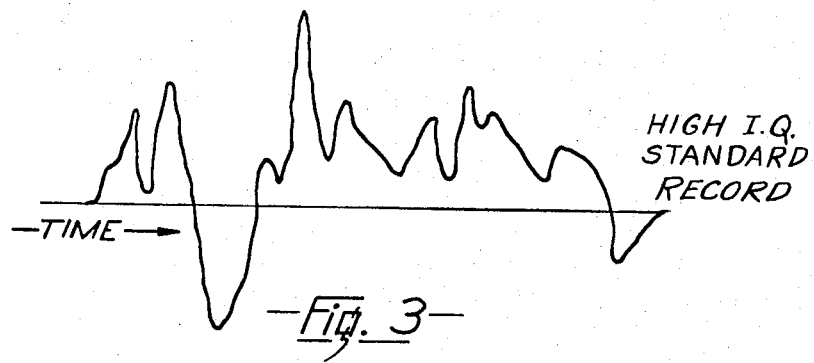
Fig. 3 — HIGH I.Q. STANDARD RECORD
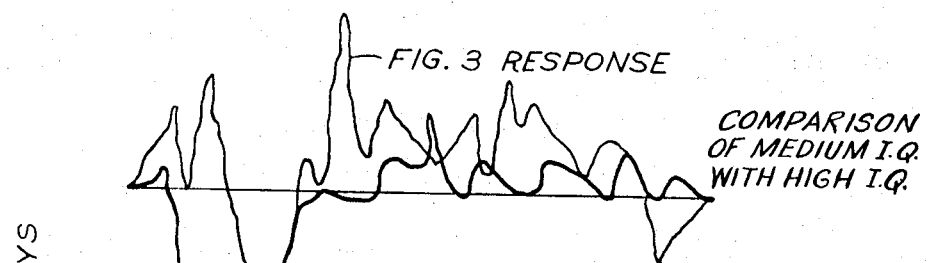
Fig. 4 — COMPARISON OF MEDIUM I.Q. WITH HIGH I.Q.
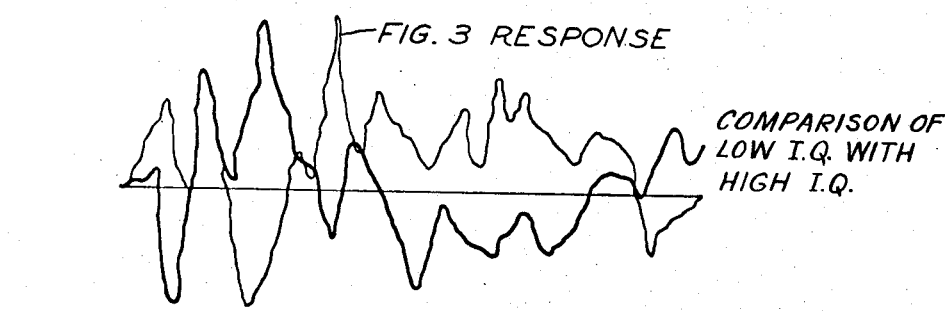
Fig. 5 — COMPARISON OF LOW I.Q. WITH HIGH I.Q.
SCALE IN MILLISEC. 0–50
MONKEYS 19.5 Hz
I.Q. = 140

20.05 Hz
I.Q. = 145

8.25 Hz
I.Q. = 88

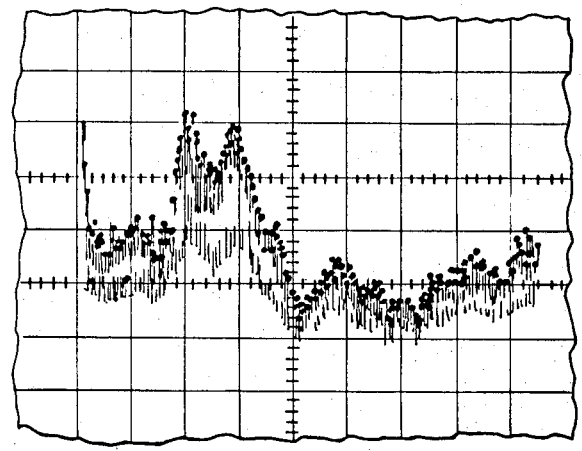
13.05 Hz
I.Q. = 115
– Fig. 9 –
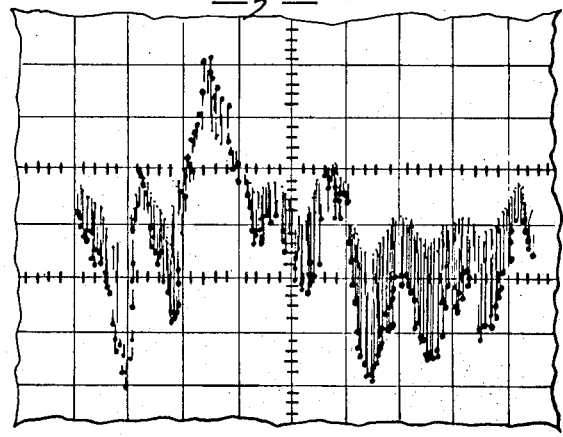
6.79 Hz
I.Q. = 77
– Fig. 10 –
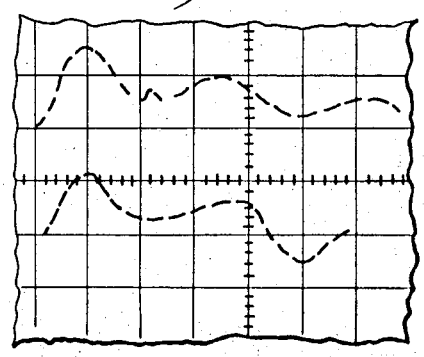
– Fig. 11 –

APPARATUS AND METHOD FOR MEASURING INTELLIGENCE

CROSS REFERENCES TO RELATED APPLICATIONS

This is a continuation-in-part application of my co-pending application Ser. No. 95,874 filed 7 Dec. 1970 for APPARATUS AND METHOD FOR PERFORMING PHYSIOLOGICAL AND PSYCHOLOGICAL TESTS, now abandoned, which is a streamlined continuation of application Ser. No. 741,194, filed 28 June 1968, a continuation-in-part of application Ser. No. 569,328, filed 1 Aug. 1966, all now abandoned.

BACKGROUND OF THE INVENTION

Field of the Invention

The invention relates to an apparatus and method for measuring intelligence, particularly of human subjects, but not limited thereto.

Prior Art i. Psychological Tests

A psychological test is defined as a systematic procedure for obtaining a sample of behaviour, after which the sample is evaluated, or scored, and interpreted. Such tests have been used in one form or another for centuries. The gymnastic tournaments of ancient Greece are among the earliest examples of such testing wherein the reaction time of the participants was determined in a rather elementary manner.

The first successful test of school aptitude was the general intelligence test of Binet who, in 1905 in Paris, assembled and used a series of problem-solving tasks to measure complex operations including the "higher" processes of abstraction and generalization. General intelligence tests, or tests of abstract or verbal intelligence of the Binet type, commonly include questions trouped as to degree of difficulty, and the question groups are such that, at the most, but a few of a particular age class can within an allotted time, answer all the questions in a group adapted to that age class. Mental age is defined as the level of performance which is median for persons of the age group in answering such a group of questions. The intelligence quotient, IQ, is obtained by dividing mental age by chronological age, and multiplying the quotient by 100.

A system or technique of the subject kind includes:

1. a stimulus - this may be for instance, a picture, a question, a task, etc.,
2. exposure of a subject to the stimulus,
3. obtaining a response from the subject,
4. evaluation of the response, which involves comparison with a pre-determined norm.

These tests are widely used, for instance in education and industry, but the area is controversial. Faults are known and recognized, many attempts have been and are being made to devise improved procedures, as evidenced by one bibliography of psychological tests and rating scales which lists 4,279 such instruments under 85 categories (Encyclopedia Brittanica, 1960 Vol. 18 at page 676) and new instruments continue to be devised. Also such tests are time consuming and usually require several hours of subject time and generally correlation of the results obtained is poor.

There is however some agreement that many inaccuracies are basically related to an environmental factor in the history of the subject being tested, and it follows, therefore, that a technique wherein the effect of this factor is reduced would mark an advance in the art.

ii. Evoked Responses

More recently, efforts have been made to obtain a measurement of the characteristics of the afferent or sensory nervous pathways. One example of this interest in sensory nerves is found in Vol. 112, Art. 1 of the annals of the New York Academy of Sciences dated 8 May 1964. This publication is entitled "Sensory Evoked Response in Man" and has 546 pages of papers by leading investigators in the field. In general the results of these investigations can be described as inconclusive, and possibly even as contradictory.

It would appear that the inconclusive nature of these investigations is a result of an inconsistency between a type of data present in the nervous system and a type of analysis applied to these data. Voltage clamp experiments on the squid axon by Hodgkin and Huxley (Journal of Physiology, 1952, Vol. 116 and 117, pages 449–544) have generally been accepted as establishing that information is conveyed along a nerve by constant amplitude and duration pulses.

If principles of electrical communications are applied to analysis of the nervous system, certain conclusions can be reached. If a stimulus with a known functional relationship is used to evoke a response which is recorded, it is then possible to calculate the amount of modification or distortion introduced into the information transmission by the characteristics of the neural pathway itself. A unit inpulse has been found to be most convenient and can be applied conveniently to most sensory receptors as will be described later.

Numerous studies have established that output signals may be obtained in response to stimuli of various kinds. Standard electroencephalograph means can be used to record these output signals from the brain, as will also be described later.

iii. Stimuli

A stimulus is suitably a pulse of short duration, measured in milliseconds or microseconds. The repitition rate is slow, but is not critical. The high limit appears to be two or three pulses per second and there is no clearly defined lower limit known to me. In the instant invention and in work performed by others a rate of about one pulse per second is satisfactory and the pulse intensity or amplitude depends upon a number of factors, and, as is well known in the art, is readily determinate experimentally in a particular case.

The application of the unit impulse to various sensory receptors can be achieved in the following manner; a flash of light can be used as an optic tract stimulus and detection of the output is best made at the occipital cortex; a "click" can be used as a stimulus for the aural tract, with output detected at the temporal cortex; or a small electrical potential may be used as the stimulus, effectively by-passing the receptor mechanism so that only the characteristics of the nerve itself are measured, and the output would be detected at the area of the cortex most closely associated with the particular neural pathway under investigation. There would also be response to stimuli of taste, touch, and smell. Accordingly, attributes related thereto might be measured in a generally similar manner.

Photic impulse has been found to be preferable for a number of reasons. Neurologically, the optic pathway is a relatively direct and well defined pathway from the eye to the occipital cortex. Further, the response of an eye to a flash of light closely resembles that obtained from the theoretical unit impulse of electrical network theory. A further reason is that psychological investigations have established that the greatest proportion of learning in our present environment is obtained visually. Also, considerable research work has already been done on the optic pathway.

iv. Recording Techniques

As mentioned previously, standard electroencephalograph means can be used to record an evoked response, also referred to as a signal or signal train, from the brain. However, recent advances in neurological research have shown that the signal can better be evaluated by means which reduce the effect of noise resulting from brain activity unrelated to the required response. The quality of a signal is often described in terms of its signal-to-noise ratio (S/N ratio), so that the greater the value of this ratio, the greater the signal legibility. It is a well-known principle, that repeating a measurement and averaging the result greatly reduces the effect of noise.

U.S. Pat. No. 3,087,487 issued to Clynes, assignor, in 1963, teaches particularly elegant apparatus for "precisely measuring signals embedded in noise", being particularly adapted to brain-wave analysis or electroencephalography. This apparatus, called an Average Transient Computer, is based upon the well-known probability phenomenon that S/N ratio improves by a factor of $n^{1/2}$, where n is the number of responses. This apparatus is admitted by experts to be a notable advance in the art, and has been utilized extensively in many fields.

v. Analysis of Signal Train into Component Waveforms

Records of evoked responses have been obtained in the aforesaid manner for many years, however, attempts to compare one record to another have been largely unsuccessful. Strictly visual comparison with qualitative descriptions has been the most popular method, although measuring "latencies" (i.e. elapsed time from the start of the record) to specified points on the waveform and/or inversely measuring the amplitude of the waveform at certain latencies have been tried with varying degrees of success. A fundamental problem with measuring as above arises from an attempt to describe a waveform having a time course of up to about one-half second with references to only one or a few points and with complicated records, such as evoked responses, it is quite easy to obtain several different records that would yield the same set of individual points.

Over the years, electrical technology has encountered similar problems which have been solved with the aid of a powerful mathematical tool known as Fourier Analysis, which analyses a complex waveform into a number of simpler component sinusoidal waveforms. In its most common form Fourier Analysis is limited to continuous waveforms (i.e. a waveform commenced at an infinite time in the past and assumed to continue for an infinite time into the future). An evoked response has a discrete length in time, that is it is a damped function, and thus Fourier Analysis in its common form cannot be applied directly.

A rather little-known variation of Fourier Analysis consists of using damped sinusoids as the component waveforms. An article by W.J. Freeman (Experimental Neurology, (December) 1964, Vol. 10, pp. 475–492) describes obtaining evoked responses from cats, which responses were analyzed in this manner. The evoked responses were obtained from electrodes that were deeply implanted in the cortex and electrical stimulation techniques were used. Although Freeman analysed the evoked responses into component waveforms, he drew no conclusions from the analyses and no further work has been performed using this technique.

Hodgkin and Huxley (loc cit) also establish a basis for the use of damped sinusoids as the component waveforms. They found a fourth-order linear differential equation to be representative of the behaviour of the cephalopod nerve, and indicated that the solution of this equation was a damped sinusoid. They also mention that "a fair degree of variability is to be expected in these respects since both frequency and damping depend on the values of the resting conductance". A simplification of their equation is found below in which;

A, B indicate amplitudes,
$a$, $b$ indicate time constants,
$t$ is time, e is the Naperian base,
$a'$, $b'$ indicate frequencies in radians/sec.,
$a''$, $b''$ indicate phase shift.

The evoked response can be represented as an equivalent voltage by the equation:

$$V(t) = Ae^{-at} \sin(a't + a'') + Be^{-bt} \sin(b't + b'')$$

In the above equation, the term using the letter "$a$" for the various coefficients and parameters shall be known as the dominant sinusoid, and the term using the letter "$b$" shall be known as the subsidiary. As a result of this definition, the coefficient A is larger than B, and it has been found that $a'$ is smaller than $b'$ and thus frequency $a'$ of the dominant sinusoid determines overall "shape" of the curve, and is hereinafter referred to an the dominant fundamental sinusoidal frequency.

SUMMARY OF THE INVENTION

The invention reduces difficulties of the prior art by providing apparatus and method in which effects of the environmental factor on a subject's intelligence are reduced. Also the time required for testing is greatly reduced from previous methods of testing. The results obtained from such apparatus and method have been compared with results from other recognised intelligence tests and comparable correlations have been noted for an equivalent or greater range of intelligence.

The invention teaches a method of measuring the intelligence of a first subject, the brain of the subject being electrically responsive to a sensory stimulus. The method includes the following steps. The subject is exposed to a repeated pulsing sensory stimulus from a source, so as to evoke from the subject a signal train responsive to and synchronized with the stimulus. The signal train is detected, amplified electronically and passed through a means to increase S/N ratio, obtaining an improved signal train having a curve with a characteristic shape having a dominant fundamental sinusoidal frequency. The improved signal train is recorded and the characteristic shape of the record is compared with characteristic shapes of similar signal train records obtained from other subjects of known intelligence, so as to obtain a measure of intelligence of the first subject.

Apparatus of the invention includes a source adapted to produce a repeating pulsing sensory stimulus, the subject being exposed to the source so as to evoke from the subject the signal train aforesaid. A detecting means co-operates with the subject to detect the signal train and to amplify it electronically. A means to increase S/N ratio is connected to the detecting means and produces an improved signal train having a curve with a characteristic shape having a dominant fundamental sinusoidal frequency. The improved signal train is recorded by a recording means connected to the means to increase S/N ratio. For comparison purposes, a set of records of improved signal trains are obtained from other subjects of known intelligence, the records being obtained under conditions similar to those existing for recording the trace of the first subject. The intelligence of the other subjects has been measured by prior art intelligence tests and provides a standard for comparison. Various means to compare the record of the improved signal train with the set of standard signal train records from subjects of known intelligence can be used to obtain a measure of intelligence of the first subject.

A detailed description following, related to drawings, gives exemplification of apparatus and method according to the invention which, however, is capable of expression in method and means other than those particularly described and illustrated.

DESCRIPTION OF THE DRAWINGS

FIG. 1 is a block diagram of apparatus according to the invention showing oscilloscope means of improving S/N ratio, FIG. 2-a is a block diagram of apparatus according to the invention utilizing parts of the apparatus according to Clynes, FIG. 2-b is a block diagram of a portion of the apparatus showing an alternative apparatus for comparison of responses, FIG. 2-c is a block diagram of a portion of the apparatus showing a further alternative apparatus for comparison of responses, FIGS. 3, 4 and 5 show responses obtained with apparatus generally as FIG. 2a, the responses being respectively from monkeys of known relatively high, average and low learning ability, a visual method of comparison of shapes being shown.

FIGS. 6 through 10 show responses from human subjects obtained with apparatus generally as FIG. 2a, each figure being shown with a corresponding analyzed dominant fundamental sinusoidal frequency and corresponding known IQ, thus serving as standard records, time scale being about 61 milliseconds per cm. where major scale lines are on a one cm. spacing, FIG. 11 shows response obtained with FIG. 1 apparatus using a simple triggerred oscilloscope with a human subject, time scale being one division equals about 60 milliseconds.

DETAILED DISCLOSURE

Preferred Embodiment of FIG. 2a

Figure 6:
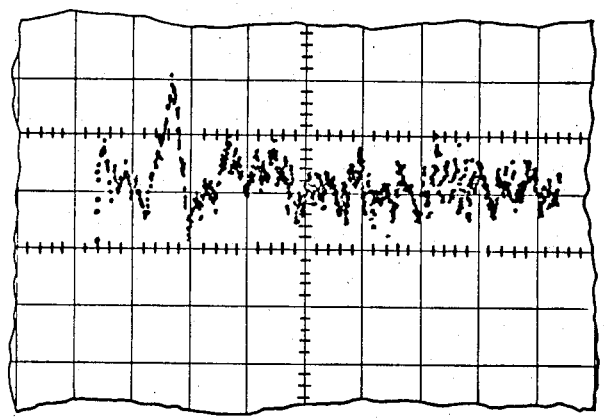

In FIG. 2a, a timing pulse generator 11 is shown with one output connected to a stimulus source 12 adapted to activate a sensory impulse source 13, here shown as photic. The timing pulse generator is of a known kind suitable for generating a pulse train as previously described, and is adapted to trigger the photic source at required intervals. A subject 15 is exposed to the photic source, the subject having an electro-encephalograph detector 17 attached to his occipital cortex as shown, the detector having an output fed to an input of an amplifier 19, preferably DC coupled. The subject thus has a brain electrically responsive to the sensory stimulus.

This is an amplifier of a common kind, reasonably flat to, say, 20 kHz, by "reasonably flat" is meant suitably plus or minus one or two decibels. If the amplifier is AC coupled, the low-frequency response should also be reasonably flat to, say 1 Hz. The amplifier has an output connected to an average transient computer 21, here shown as a Clynes apparatus having a digital readout and being coupled to an oscilliscope display screen. A second output of the timing pulse generator is connected to the triggered sweep input of the average transient computer. Thus, each time the photic source is triggered, one sample signal train is entered into the average transient computer. This process is repeated so that, for example, the responses of about fifty pulses are entered into the average transient computer. With the normal programming of the average transient computer, the several responses are added together so as to improve S/N ratio of the signal train as previously described, producing an improved signal train.

In FIG. 2a, after a signal train with a suitably improved S/N ratio has been obtained, the signal train is fed from the average transient computer through a suitable interface 23 to a digital computer 24, typically an IBM 360, for analysis into dominant and subsiduary sinusoids as has been described. The digital computor is programmed to analyse the improved signal train to obtain the dominant sinusoidal frequency and then to compare this frequency so determined with records of dominant sinusoidal frequency obtained from other subjects of known intelligence which records serve as standards. This requires a frequency analysis program 26 and a correlation program 27.

Figure 7:
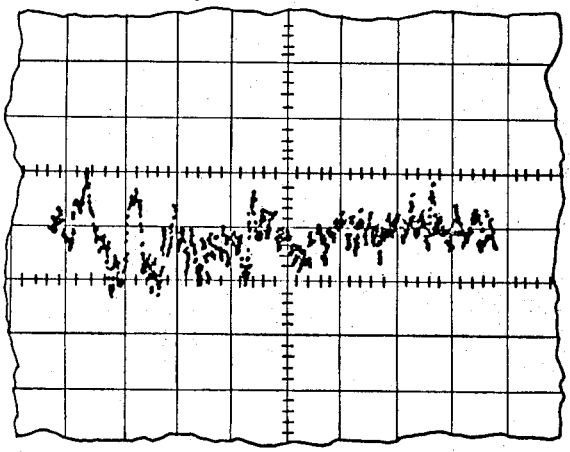
Figure 8:
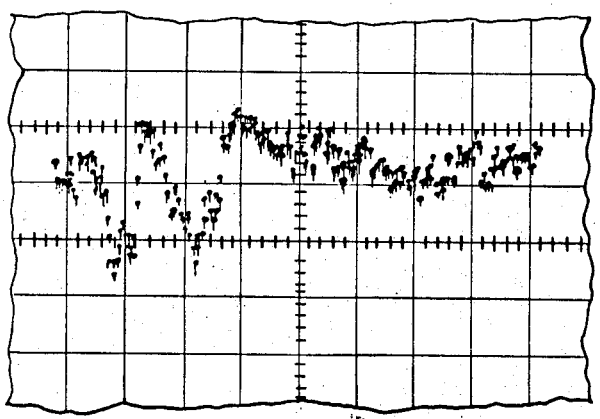

Similarly to any measurement method of this type, the method according to the invention requires comparison with a predetermined norm or standard. A group of other subjects is selected, which subjects have been previously tested by known and accepted intelligence testing methods e.g. filling out a questionaire. The group is selected so that the intelligences of the subjects range in roughly equal increments from a low end to a high end of the intelligence scale. The group of subjects is then tested by method and apparatus according to the invention as above and a series of records obtained, each record pertaining to a subject of known intelligence so as to produce a standard for each subject of a particular intelligence within the group. The records above serve as standard records for a particular stimulus and incremental separation of the standards is dependent on the group. The standard record can be a photograph of a trace displayed on a screen of an ATC similar to the traces shown in FIGS. 6 through 10, or the record could be analysed to obtain dominant sinusoidal frequency of the improved signal. The standard selected is dependent on apparatus available and method of comparison to be used, preferred standard when computer facilities are available being dominant fundamental frequencies. Thus in FIG. 2a, the correlation program 27 relates intelligence of a subject to dominant fundamental sinusoidal frequency of the evoked response of the subject.

OPERATION

In operation, a first subject is connected to the above-described apparatus and is exposed to a suitable number, say 50, sensory impulses and the resulting signal trains are amplified and the S/N ratio is improved by means of the average transient computer, which process takes about one minute. The improved signal train is analyzed into component waveforms by means of the suitably programmed digital computer, which also compares the frequency of the dominant damped sinusoidal function with the standard records of similar frequencies obtained from subjects having known intelligence, so as to provide a measure of intelligence of the first subject.

ALTERNATIVES AND EQUIVALENTS

I am not limited to the use of the apparatus mentioned in the above description. There are numerous other digital computers that would perform an equivalent analysis to the IBM 360, and there are several types of average transient computers, for example the Computer of Average Transients and the Enhancetron (trademarks) are two such equivalent means to improve S/N ratio. Also, if desired, the improved signal trains of several subjects from the average transient computer can be recorded on magnetic tape, which tape can be processed by the digital computer later, thus reducing computer time.

The use of a digital information connection from the average transient computer to the digital computer can also be avoided if so desired. To do this, the analogue read-out of the average transient computer is used and the record of the signal train can be obtained by several different means. The signal trains shown in FIGS. 3, 4 and 5 were obtained using an X-Y plotter (not shown) as the display means for the average transient computer. The signal trains shown in FIGS. 6, 7, 8, 9, and 10 were obtained using an oscilloscope display screen 32 as the display means for output of the average transient computer. Both sets of records shown in these figures serve as an approximate standard the standard being dependent on the method of testing.

The average transient computer as is illustrated in FIG. 2a can be eliminated by feeding the timing impulse generator output and the amplifier output into an oscilloscope 35 with a triggered time base as shown in FIG. 1. Portions of the apparatus up to the oscilloscope in FIG. 1 and FIG. 2a are the same and are similarly annotated. The amplifier has an output connected to a vertical input of an oscilloscope, preferably DC coupled, having a triggered horizontal sweep 36. The oscilloscope vertical response is required only to be consistent with that of the amplifier. A second output of the timing pulse generator is connected to the triggered horizontal sweep input of the oscilloscope. Thus, each time the photic source is triggered, a pattern appears on the oscilloscope. A camera 38 is attached to the oscilloscope in an ordinary manner so that a photograph 39 of a plurality of superimposed images of, for example, the responses of about fifty pulses is obtained. The signal train shown in FIG. 11 was obtained in this manner, but as noted, results obtained from these superimposed images are not as legible as those obtained from the ATC.

A triggered memory or storage oscilloscope can be used for the simple triggered oscilloscope, and, with the signal train being stored in a memory unit of the oscilloscope, results which are more readily processed are achieved. Another alternative (not shown) is to feed the amplifier output to a tape recorder, with the recorded tape being played back and displayed on a triggered oscilloscope, steps thereafter being as before described. The improved S/N ratio signal trains so obtained can be photographed similarly to FIGS. 6 through 10 to obtain a permanent visual record.

Alternative means are available to analyze the permanent visual record obtained as described. The record can be traced by means of a curve tracer 41 (FIG. 1), output of the curve tracer being fed into a digital computer 42, suitably an IBM 360, for analysis and electronic comparison as has been described using frequency analysis and correlation programs 44 and 45.

Another means of analysis is shown in FIG. 2b in which an image of the improved signal train record shown on the display screen 32 of the average transient computer 21 is photographed with a camera 47 to produce a photograph 48. The photograph is projected by a projector 50 onto a display screen 52 of an analogue computer 53. Controls of the analogue computer are adjusted to synthesise an equivalent waveform on the screen, so that the equivalent waveform approximates to the image of the visual record. By inspecting controls of the analogue computer, fundamental sinusoidal frequency of the synthesized waveform can be determined, directly in Hertz which frequency approximates to the frequency of the unknown waveform. This frequency is then compared visually with a correlation table 55 which serves as a standard for correlating IQ with fundamental sinusoidal frequencies of subjects of known intelligence.

Another means of analysis shown in FIG. 2c, is to compare the visual record of improved signal train with similar visual standard records of subjects of known intelligence, hereinafter standard intelligence curves. It is to be noted that in using this means of analysis, the fundamental frequency is not determined. The operator compares visually overall characteristic shapes of the curves, which characteristic shapes are determined mainly by the dominant fundamental sinusoidal frequency A camera 57 produces a photograph 59 of the trace on the screen 32, which photograph is then compared visually with photographs of the standard intelligence curves, which curves are preferably on transparent overlays 60. With practice, visual comparison as above produces a relatively accurate measure of intelligence without the expense of analogue or digital computers. If the computer facilities are available, a more accurate measure of fundamental sinusoidal frequency can be determined.

A further means of analysis consists of displaying the improved signal train obtained from an average transient computer on a display screen and comparing visually with standard intelligence curves as previously described.

The effectiveness of the apparatus and method described above is attributed to the neuro-chemical method by which sensory information is processed within the nervous system. As such it would seem that the effect of environmental factors is greatly reduced in this method of measuring intelligence when compared to prior art methods. Also the subject's time required for testing is greatly reduced from the time required for prior art tests and results obtained using the methods hereindescribed correlate adequately with results obtained from many prior art tests for an equivalent or greater range of intelligence. Repeatability of results is also comparable with, or better than, prior art repeatability.

ANIMAL SUBJECTS

FIGS. 3 through 5 show responses obtained from monkeys of known relative learning ability. As learning ability is considered to be a function of intelligence, it is possible to obtain a set of standard records of learning ability for particular animals so as to facilitate comparison of animal intelligence, for example when for training animals are selected from a group. This could have application in selecting animals from a group in which learning ability is important for example police dogs, dogs for the blind and animals used in space research.

I claim:

1. A method of measuring intelligence of a first subject having a brain electrically responsive to a sensory stimulus, the method including steps as follows:
   a. exposing the subject to a repeated pulsing sensory stimulus from a source so as to evoke from the subject signal trains responsive to and synchronized with the stimuli,
   b. detecting the signal trains and amplifying them electronically to produce amplified signal trains,
   c. improving the amplified signal trains by passing them through a means to increase signal-to-noise ratio so as to obtain an improved signal train having a curve with a characteristic shape having a dominant fundamental sinusoidal frequency,
   d. recording the improved signal train so as to obtain a record of the improved signal train,
   e. comparing the characteristic shape of the record with characteristic shapes of similar signal train records of other subjects of known intelligence so as to obtain a measure of intelligence of the first subject.

2. A method according to claim 1 in which the steps of improving and recording the amplified signal trains include the steps of:
   i. passing the amplified signal trains through an average transient computer to obtain an improved record,
   and the steps of comparing the record further include the steps of:
   ii. analysing the dominant fundamental sinusoidal frequency of the improved record so obtained,
   iii. comparing the frequency so obtained with frequencies of similar records obtained from other subjects of known intelligence so as to obtain a measure of intelligence of the first subject.

3. A method according to claim 2 in which the step of comparing the record of the improved signal train includes:
   i. feeding the record of the improved signal train into a digital computer programmed to analyze the dominant fundamental sinusoidal frequency, and also programmed to compare the dominant fundamental sinusoidal frequency so analyzed with dominant fundamental sinusoidal frequencies of the subjects of known intelligence, so as to obtain a measure of intelligence of the first subject.

4. A method according to claim 1 in which the steps of improving and recording the signal train include:
   i. passing the amplified signal trains through an average transient computer to obtain an improved signal train with increased signal-to-noise ratio,
   ii. displaying the improved signal train as a trace on a display screen connected to the average transient computer,
   and the steps of further recording and comparing the record include:
   iii. photographing the trace so as to obtain a photograph providing a visual record of the trace of the improved signal train,
   iv. projecting an image from the photograph of the trace onto a display screen of an analogue computer having a control potentiometer calibrated to indicate fundamental frequency,
   v. synthesizing with the controls of the analogue computer an equivalent wave form on the screen of the analogue computer so that the equivalent wave form approximates to the image of the visual record,
   vi. inspecting controls of the analogue computer to determine the dominant fundamental sinusoidal frequency of the synthesized waveform,
   vii. comparing the determined dominant fundamental sinusoidal frequency with dominant fundamental sinusoidal frequencies of other subjects of known intelligence.

5. A method according to claim 1 in which the steps of improving and recording the improved signal train include:
   i. passing the amplified signal trains through an average transient computer to obtain an improved signal train with an increased signal-to-noise ratio,
   ii. displaying the improved signal train as a trace on a display screen connected to the average transient computer,
   iii. photographing the trace so as to obtain a photograph of the trace,
   and the method of comparing the trace further including the steps of:
   iv. comparing the characteristic shape of the signal train by comparing visually the photograph of the trace with photographs of similar traces of other subjects of known intelligence, so as to obtain a measure of intelligence of the first subject.

6. A method according to claim 1 in which the steps of improving and recording the amplified signal trains include the steps of:
   i. displaying the amplified signal trains as traces on an oscilloscope screen, the oscilloscope having a triggered time base horizontal sweep,
   ii. triggering the oscilloscope so as to synchronize the sweeps with the repeating sensory stimulus to obtain traces of the signal trains in synchronization with the stimulus,
   iii. photographing a plurality of the traces so as to obtain a photograph of multiple superimposed traces,
   iv. tracing the photograph with a curve tracer so as to obtain a record of an improved signal train having an increased signal-to-noise ratio.

7. An apparatus for measuring intelligence of a first subject having a brain electrically responsive to a sensory stimulus, the apparatus including:

a. a source adapted to stimulate the subject, a timing pulse generator connected to the source to produce a trigger so that the source is triggered to produce a repeating pulsing sensory stimulus, a signal train responsive to and in synchronization with the stimuli being evoked from the subject, b. detecting means adapted for attachment to the subject to detect the signal train and to amplify it electronically, c. means to increase signal-to-noise ratio connected to the detecting means and to the timing pulse generator so as to be triggered simultaneously with the repeating sensory stimulus to obtain an improved signal train having a curve with a dominant fundamental sinusoidal frequency, d. recording means cooperating with the means to increase signal-to-noise ratio to record the improved signal train of the subject, e. a set of standard records of improved signal trains obtained from other subjects of known intelligence, the standard records being obtained under conditions similar to those existing for recording the improved signal train of the first subject, f. means to permit comparison of the record of the improved signal train of the subject with the standard records from the other subjects of known intelligence, so as to obtain a measure of intelligence of the first subject.

8. An apparatus as claimed in claim 7 in which:

i. the means to increase signal-to-noise ratio and a portion of the recording means are an average transient computer and a display screen connected to the computer, the screen displaying a trace of the improved signal train of the subject, ii. the recording means further includes a camera to photograph the improved signal train so as to obtain a photograph providing a visual record of the improved signal train, iii. the set of standard records of improved signal trains includes a correlation between intelligence of a subject and dominant fundamental sinusoidal frequency of the evoked response of the subject, iv. a portion of the means to permit comparison of the record of the subject with the standard records includes:

a. an analogue computer having a screen and manual control potentiometers to permit a manual synthesis of an equivalent wave form on the screen, a control potentiometer of the analogue computer being calibrated to indicate dominant fundamental sinusoidal frequency of the synthesized wave form;

b. a projector to project an image of the visual record of the trace of the subject onto the screen of the analogue computer so that the equivalent wave form synthesized on the screen of the analogue computer approximates to the image of the visual record from the projector, so as to permit comparison of the frequency of the synthesized wave form with the frequencies shown in the correlation in the set of standard records to obtain a measure of the intelligence of the first subject.

9. An apparatus as claimed in claim 7 in which:

i. the means to increase the signal-to-noise ratio and the recording means are an average transient computer, ii. the set of standard records includes a digital computer correlation program in which intelligence of a subject is correlated to dominant fundamental sinusoidal frequency of the evoked response of the subject, the program having been made by testing on the said apparatus a group of subjects of known intelligences, the group comprising of individuals whose intelligences range from low to high intelligence, frequencies obtained by the testing being correlated to known intelligence of the subjects, and a portion of the means to permit comparison of the record includes:

iii. a digital computer programmed to analyse the dominant fundamental sinusoidal frequency of the record and programmed to compare the dominant fundamental sinusoidal frequency so analysed with the computer program of correlation between frequencies of the records and intelligence, so as to obtain a measure of intelligence of the first subject, iv. a compatible digital computer interface connecting the digital computer to the average transient computer.

10. An apparatus as claimed in claim 7 in which:

i. the means to increase signal-to-noise ratio and a portion of the recording means are an average transient computer and a display screen connected to the average transient computer, the screen adapted to display a trace of the improved signal train, ii. the recording means further includes a camera to photograph the improved signal train so as to obtain a photograph providing a visual record of the improved signal train, for visual comparison with standards comprising photographs of similar traces of subjects of known intelligence.

11. An apparatus as claimed in claim 7 in which the means to increase signal-to-noise ratio and the recording means include:

i. a triggered time base oscilloscope having a display screen and a horizontal sweep having an input, the input being connected to the timing pulse generator so that the sweep is triggered by each pulse so as to be synchronized with the source to produce traces of the signal trains on the screen synchronized with the source, ii. a camera to photograph a plurality of traces to obtain a photograph of multiple superimposed traces, iii. a curve tracer to trace the photograph to obtain an improved signal train having an increased signal-to-noise ratio.

* * * * *